United States Patent
Balachandran et al.

(10) Patent No.: US 6,483,828 B1
(45) Date of Patent: Nov. 19, 2002

(54) SYSTEM AND METHOD FOR CODING IN A TELECOMMUNICATIONS ENVIRONMENT USING ORTHOGONAL AND NEAR-ORTHOGONAL CODES

(75) Inventors: Kumar Balachandran, Cary, NC (US); Rajaram Ramesh, Cary, NC (US); Havish Koorapaty, Raleigh, NC (US); Eric Wang, Cary, NC (US); Sandeep Chennakeshu, Cary, NC (US); Amer Hassan, Kirkland, WA (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/248,506

(22) Filed: Feb. 10, 1999

(51) Int. Cl.[7] .................................................. H04B 7/216
(52) U.S. Cl. ......................... 370/342; 370/441; 370/474
(58) Field of Search ............................... 370/328, 320, 370/335, 342, 441, 476, 474, 204, 208, 209

(56) References Cited

U.S. PATENT DOCUMENTS

| | | | | |
|---|---|---|---|---|
| 5,373,502 A | | 12/1994 | Turban | 370/18 |
| 5,398,258 A | * | 3/1995 | Su et al. | 370/277 |
| 5,774,844 A | * | 6/1998 | Akagiri | 704/215 |
| 5,856,797 A | * | 1/1999 | Kawauchi | 341/76 |
| 5,859,877 A | * | 1/1999 | Betts et al. | 332/103 |
| 6,085,349 A | * | 7/2000 | Stein | 714/778 |
| 6,341,125 B1 | * | 1/2002 | Hong et al. | 370/335 |
| 6,351,500 B2 | * | 2/2002 | Kumar | 329/357 |

FOREIGN PATENT DOCUMENTS

| WO | WO 92/17012 | 10/1992 |
|---|---|---|
| WO | WO 99/01994 | 1/1999 |

OTHER PUBLICATIONS

ISR for PCT/US00/03342 completed on Apr. 19, 2000.

* cited by examiner

Primary Examiner—David Vincent
(74) Attorney, Agent, or Firm—Moore & Van Allen, PLLC; Gregory Stephens

(57) ABSTRACT

A system and method for permitting variable information rates and improved error performance using orthogonal or near-orthogonal codes is disclosed. This is achieved by simultaneously transmitting two or more Walsh code words from a given orthogonal code set and/or by transmitting multiple shorter orthogonal codewords sequentially such that their combined length equals the original codeword. It should be emphasized that the present invention can be used with any orthogonal or near-orthogonal code set.

57 Claims, 8 Drawing Sheets

SYSTEM AND METHOD FOR CODING IN A TELECOMMUNICATIONS ENVIRONMENT USING ORTHOGONAL AND NEAR-ORTHOGONAL CODES

DESCRIPTION

1. Technical Field of the Invention

The invention relates to the field of telecommunications and more particularly, to a system and method for providing variable user information rates and for improving performance and bandwidth utilization in telecommunications systems using orthogonal codes for error control.

2. Description of Related Art

The cellular telephone industry has made phenomenal strides in commercial operations throughout the world. Growth in major metropolitan areas has far exceeded expectations and is outstripping system capacity. If this trend continues, the effects of rapid growth will soon reach even the smallest markets. The predominant problem with respect to continued growth is that the customer base is expanding while the amount of electromagnetic spectrum allocated to cellular service providers for use in carrying radio frequency communications remains limited. Innovative solutions are required to meet these increasing capacity needs in the limited available spectrum as well as to maintain high quality service and avoid rising prices.

Currently, channel access is primarily achieved using Frequency Division Multiple Access (FDMA) and Time Division Multiple Access (TDMA) methods. In FDMA systems, a physical communication channel comprises a single radio frequency band into which the transmission power of a signal is concentrated. In TDMA systems, a physical communications channel comprises a time slot in a periodic train of time intervals transmitted over the same radio frequency. Usual methods of implementing a TDMA system incorporate FDMA as well.

Spread spectrum comprises a communications technique that is finding commercial application as a new channel access method in wireless communications. Rudimentary spread spectrum systems have been around since the days of World War II. Early applications were predominantly military-oriented (relating to smart jamming and radar). However, there is an increasing interest today in using spread spectrum systems in communications applications, including digital cellular radio, land mobile radio, and indoor/outdoor personal communication networks.

Spread spectrum operates quite differently from conventional TDMA and FDMA communications systems. In a direct sequence code division multiple access (DS-CDMA) spread spectrum transmitter, for example, a digital symbol stream for a given dedicated or common channel at a basic symbol rate is spread to a "chip" rate. This spreading operation involves applying a spreading code that is channel-unique (sometimes referred to as a "signature sequence") to the symbol stream that increases its transmission rate (as well as the bandwidth requirement) while adding redundancy. Typically, the digital symbol stream is multiplied by the unique digital code during spreading. The intermediate signal comprising the resulting data sequences (chips) is then summed with other similarly processed (i.e., spread) intermediate signals relating to other (dedicated or common) channels.

A scrambling code that is unique to a base station (often referred to as a "long code" since in most cases it is longer than the spreading code) is then applied to the summed intermediate signals to generate an output signal for multi-channel transmission over a communications medium. The intermediate signals derived from the various dedicated or common channels thus advantageously share one transmission communications frequency band, with the multiple signals appearing to be located on top of each other in both the frequency domain as well as the time domain. Because the applied spreading codes are unique to each channel, however, each intermediate signal that is transmitted over the shared communications frequency is similarly unique, and may be distinguished from others through the application of proper processing techniques at the receiver end.

In the DS-CDMA spread spectrum mobile station (receiver), the received signals are recovered by applying (i.e., multiplying, or matching) the appropriate scrambling and spreading codes to despread, or remove the coding from the desired transmitted signal and return to the basic symbol rate. Where the spreading code is applied to other transmitted and received intermediate signals, however, only noise is produced. The despreading operation thus effectively comprises a correlation process comparing the received signal with the appropriate digital code to recover the desired information from the channel.

Orthogonal codes or near-orthogonal codes (i.e., codes having relative high relative auto-correlation and low relative cross-correlation values) are used for error control in telecommunications systems. Walsh codes are one example of an orthogonal code. In a coding scheme using Walsh codes, a k-bit information word ("infoword") is converted into a $2^k$-bit sequence using the Hadamard transform. Such a conversion will be referred to in this patent application as a $(2^k,k)$ orthogonal code. A Walsh code for encoding a 2-bit information sequence to a 4-bit orthogonal codeword is shown below:

$$H_4 = \begin{vmatrix} 1 & 1 & 1 & 1 \\ -1 & 1 & -1 & 1 \\ 1 & 1 & -1 & -1 \\ 1 & -1 & -1 & 1 \end{vmatrix}$$

Here, the four rows of the matrix $H_4$ form the code words for the four information symbol sequences whose binary values are equal to the numeric values of the four row indices. For example, the information sequences (0,0), (0,1), (1,0) and (1,1) would be mapped to the codewords (1,1,1,1), (1,-1, 1,-1), (1,1,-1,-1) and (1,-1,-1,1) respectively. The Fast Hadamard Transform is then used to demodulate the incoming signal non-coherently. The Fast Hadamard Transform acts as a correlator, and those code-word(s) (or component (s) thereof) that have the highest correlation values can then be identified as the transmitted code-word(s). The uniqueness of the mapping between the 2-bit information sequences and the 4-symbol code words (in the example above) allows the unambiguous detection and decoding of the transmitted symbols.

The use of the Walsh-Hadamard codes described above result in a bandwidth expansion of $2^k/k$ (i.e., a k-bit information word expands to a $2^k$-bit code word) which is quite high. The inverse of the bandwidth expansion is referred to as the coding rate. Consequently, these Walsh-Hadamard codes are normally used in very low signal-to-noise ratio environments. For example, the IS-95 CDMA system compensates the low signal-to-interference ratios in the system through the use of such codes. Another application for such schemes is in random access protocols for cellular and mobile satellite systems, where users may be trying to initially synchronize to the system, or attempting to originate a call or answer an incoming call.

It has been found desirable to find new techniques to improve the coding rate in a telecommunications system employing orthogonal codes. It has further been found desirable to find techniques for reducing the bandwidth expansion. An ideal telecommunications system employing orthogonal codes would thus have only that bandwidth expansion that is necessary to separate the multiple transmissions from various users without reducing the efficiency of spectrum utilization by too large a factor.

SUMMARY OF THE INVENTION

It is therefore a primary object of the present invention to provide improved performance in telecommunications systems using orthogonal codes for error control. It is a further object of the present invention to reduce bandwidth expansion in such telecommunications systems. It is also an object of the present invention to improve the coding rate in a telecommunications system employing orthogonal codes.

Orthogonal codes or near-orthogonal codes (i.e., codes having high relative auto-correlation and low relative cross-correlation values) are used for error control in communication systems. For example, the IS-95 CDMA cellular standard uses a (64,6) orthogonal Walsh code on the reverse link (i.e., the link from the mobile station to the base station) for error control. As noted earlier, such a set of Walsh codes converts each 6-bit information word into a 64-symbol code word in such a way that each of the sixty-four such 64-symbol codes are orthogonal relative to each other.

The present invention allows variable transmission rates and/or improved error performance to be provided to users in conjunction with the use of orthogonal or near-orthogonal codes. In one embodiment of the present invention, this is achieved by the parallel (i.e., simultaneous) transmission of multiple codewords each of which represents a different information sequence. In an alternative embodiment, multiple shorter orthogonal codewords with higher coding rates are transmitted sequentially (one after the other) such that their combined length is the same as the original codeword. In an extension of the present invention, these two methods are combined to transmit sets of shorter codewords both simultaneously and sequentially.

When multiple codewords are transmitted simultaneously, the associated decoder needs to be able to determine the relative sequence of the codewords being transmitted simultaneously. In the preferred embodiment of the present invention, part of the information sequence being encoded is used for this purpose. The receiver decodes the transmitted codewords by selecting those codewords that have the highest correlation values with the received sequence.

It should be noted that orthogonal or near-orthogonal codes are used in some concatenated coding schemes. For example, the IS-95 CDMA standard specifies a concatenated coding scheme where a convolutional code having a rate of 1/3 and a constraint length of 9 is followed by a repetition code and a (64,6) Walsh code. In this IS-95 standard, the convolutional code is called the outer code while the Walsh code is called the inner code. In a system with concatenated coding where orthogonal or near-orthogonal codes are used as the inner code, the transmission of multiple codewords (both simultaneously and sequentially) can be used to increase the redundancy of the outer code and possibly improve the error performance of the overall coding scheme while maintaining the same overall bandwidth expansion. In this manner, the system and method of the present invention can be used to provide variable transmission rates and possibly improve error performance for a system using concatenated coding.

The present invention aims at allowing variable information rates or improved error performance with orthogonal or near-orthogonal coding through better bandwidth utilization. This is achieved by simultaneously transmitting two or more code words from a given orthogonal code set and/or by transmitting multiple shorter orthogonal codewords sequentially such that their combined length equals the longer codeword. It should be emphasized that the present invention can be used with any orthogonal or near-orthogonal code set.

The system and method of the present invention may be used in a variety of applications, e.g., in wireless communication systems, cellular radio, satellite communications, simulcast transmission, land mobile radio and cellular systems, etc. The use of the techniques detailed in the present application permits an increase in the information rate without a concomitant increase in the bandwidth requirement. This increased information rate can be used to provide variable information rates to users.

In one aspect the present invention is a system and method for improving the coding efficiency and bandwidth utilization of a Code Division Multiple Access (CDMA) transmission channel. The technique of the present invention permits the efficient encoding and transmission of an original information word having 2k bits by splitting the original information word into two equal parts having k bits each.

One part of the original information word is extended with a single bit having the value zero. The other part of the original information word is extended with a single bit having the value one. The extension of the halfwords can be done by prefixing or suffixing the additional bit to the halfword or by inserting the additional bit into the halfword.

The k+1 bits of the two extended halfwords are then encoded using a $(2^{k+1}, k+1)$ Walsh code to obtain two corresponding Walsh codewords, each having $2^{k+1}$ symbols. The two Walsh codewords are summed to obtain a composite Walsh codeword having $2^{k+1}$ symbols. The composite Walsh codeword having $2^{k+1}$ symbols is then optionally modulated and transmitted over an air interface. If the composite Walsh codeword having $2^{k+1}$ symbols is modulated and transmitted over an air interface, in another aspect of the present invention this transmission is received over an air interface and demodulated to recover the pair of composite Walsh codeword each having $2^{k+1}$ symbols.

In another aspect, the system and method of the present invention also presents a technique for decoding a demodulated composite Walsh codeword received over a Code Division Multiple Access (CDMA) transmission channel. In this aspect, a received composite Walsh codeword is first decomposed into its component Walsh codewords using the Fast Hadamard Transform. Each of the component Walsh codewords is then decoded to obtain associated information halfwords.

The decoded information halfwords are sorted into two lists based upon the value of an index bit at a specific position in the halfword being either zero or one. The decoded information halfwords are then further sorted in decreasing order of correlation between the Walsh codeword associated with the halfword and the composite Walsh codeword received. The index bit is then deleted from the two information halfwords having the highest correlation values to obtain two corresponding data halfwords. The two data halfwords are then concatenated in a specific order to recover the original information word that was transmitted.

In another aspect, the system and method of the present invention can be generalized to the simultaneous transmission of multiple encoded information partwords. In this aspect, an original information word having M times K bits of binary information is split into M information partwords having K bits each. Each of the M information partwords is concatenated or combined with N index bits, where N is at least equal to $\lceil \log_2 M \rceil$.

In the preferred embodiment of the present invention, the index bits for the $m^{th}$ information partword are the binary representation of m−1. As before, the N index bits can be prefixed, suffixed or intermixed with the K bits of the information partword. The K+N bits of the M extended information partwords are then encoded using a $(2^{K+N}, K+N)$ Walsh code to obtain a group of M Walsh codewords, each having $2^{K+N}$ symbols. The M Walsh codewords are then summed to obtain a summed Walsh codeword with $2^{K+N}$ symbols that is optionally modulated and transmitted over a broadcast channel.

The associated decoder of the present invention first demodulates a composite Walsh codeword received over a Code Division Multiple Access (CDMA) transmission channel. The received composite Walsh codeword of length $2^{K+N}$ symbols is next decomposed into M lists of component Walsh codewords having $2^{K+N}$ symbols each using the Fast Hadamard Transform. Each of the M lists of component Walsh codewords is then decoded to obtain M lists of information partwords each of which is K+N bits in length.

The components of the M lists of decoded information partwords are chosen based upon the binary value contained in the N index bits of the partwords. Each of the M lists of decoded information partwords is sorted by decreasing value of correlation between the Walsh codeword associated with a partword and the received composite Walsh codeword.

The highest ranking partword is next selected from each of the M lists and these M selected partwords are then converted into M data partwords of K bits each by deleting the N index bits from each of the partwords. Finally, the M data partwords are assembled in a specific order using the index bits to recover the original information word.

In a further embodiment of the present invention, an original information word having M times K bits of binary information is split into M information partwords having, on average, K bits each (i.e., M·K=$k_1$+$k_2$+ ... +$k_m$). Each of the M information partwords is combined with N index bits, where N is at least equal to $\lceil \log_2 M \rceil$. The rest of the coding and decoding process for this embodiment of the invention is the same as for the earlier case where the M information partwords were of equal length.

In yet another aspect, the present invention discloses a system and method for encoding an original information word having $\lfloor \log_2 (2^{2k-1}+2^{K-1}) \rfloor$ bits of binary information. In this aspect, a set of extended Walsh codes $2^K$ symbols in length is created first. The extended Walsh code set includes all single Walsh codewords having $2^K$ symbols and all combinations of two 2K-symbol Walsh codewords.

Each distinct information word is mapped to either a simple codeword or to a combination of two codewords from the extended Walsh code set. If the information codeword is mapped to a simple Walsh codeword, the simple codeword is modulated and transmitted. If the information codeword is mapped to a combination of two Walsh codewords, the two Walsh codewords are summed, modulated and transmitted in parallel. All transmitted codewords are buffered as appropriate to obtain a uniformly framed Walsh codeword $2^K$ symbols in length.

The associated decoder of the present invention first demodulates the composite Walsh codeword received over a telecommunications channel employing orthogonal codes. A threshold value is first specified that sets the maximum acceptable difference in the correlation values of received Walsh codeword pairs.

The received composite codeword of length $2^k$ symbols is decomposed into one or more component Walsh codewords having $2^K$ symbols each using the Fast Hadamard Transform. The component Walsh codewords are sorted in decreasing order of correlation between the component codewords and the composite Walsh codeword.

The two highest ranking component codewords are selected from the list if the difference between their correlation values is less than the specified threshold value. On the other hand, if the difference between the correlation values of the two highest ranking component codewords is more than the specified threshold value, then only the highest ranking component Walsh codewords is selected for decoding. Finally, a mapping table is used to look up the information word that is associated with the selected Walsh codeword(s).

In another aspect of the present invention, an information word having 2K bits is serially encoded by splitting the information word into a first part having K+M bits and a second part having K−M bits. The K+M bits of the first part of the information word are encoded using a $(2^{K+M}, K+M)$ Walsh code to obtain a first Walsh codeword having $2^{K+M}$ symbols. The K−M bits of the second part of the information word are encoded using a $(2^{K-M}, K-M)$ Walsh code to obtain a second Walsh codeword having $2^{K-M}$ symbols. The two Walsh codewords are then concatenated to obtain an extended Walsh codeword with $2^{K+M}+2^{K-M}$ symbols. This extended Walsh codeword is then modulated and transmitted over an air interface.

The decoder associated with the above encoding scheme first demodulates the composite Walsh codeword received over a telecommunications channel employing orthogonal codes to yield a concatenated Walsh codeword that comprises two sequentially transmitted Walsh codewords—one $2^{K+M}$ symbols in length and the other $2^{K-M}$ symbols in length. This received Walsh codeword frame is first split into its pair of component Walsh codewords (of length $2^{k+M}$ and $2^{k-M}$ symbols).

The pair of component Walsh codewords are next translated into a pair of information partwords having K+M bit and a K−M bit using the Fast Hadamard Transform. The pair of translated information partwords are then reassembled in a prespecified order (such as in the order in which they were received) to recover the original information word having 2K bits.

In a further embodiment of the present invention, an original information word having M times K bits of binary information is split into M information partwords having, on average, K bits each (i.e., M·K=$k_1$+$k_2$+ ... +$k_m$). Each of the M information partwords is combined with N index bits, where N is at least equal to $\lceil \log_2 M \rceil$. These M extended (and possibly unequal) partwords are then sequentially transmitted as M Walsh codewords—of length $2^k$, $2^{k2}$, ... $2^{km}$ symbols. The rest of the coding and decoding process for this embodiment of the invention is similar to the case where the sequentially transmitted partitions are equal in length.

A simplified decoder associated with the same encoding scheme first demodulates the composite Walsh codeword received over a telecommunications channel employing orthogonal codes to yield a concatenated Walsh codeword that comprises M sequentially transmitted Walsh codewords each $2^K$ symbols in length. This received Walsh codeword frame is first split into M component Walsh codewords each having $2^K$ symbols.

Each of the M component Walsh codewords are then translated into a K-bit information partword using a mapping table. Each of the M translated information partwords are then reassembled in the order in which they were received to recover the original information word having K times M bits.

BRIEF DESCRIPTION OF THE DRAWINGS

A more complete understanding of the method and system of the present invention may be obtained by reference of the detailed description of the preferred embodiments that follow, taken in conjunction with the accompanying drawings, wherein.

DESCRIPTION OF THE PREFERRED EMBODIMENT

The system and method of the present invention can be best explained by considering a system that uses a $(2^{10},10)$ Walsh code as an illustrative example. As known and appreciated by those of ordinary skill in the art, this coding scheme results in an approximately hundred-fold (i.e., 20 dB) bandwidth expansion, or equivalently, has a coding rate of 10/1024 (i.e., every 10-bit information word is mapped to one of a set of 1024 codewords each of which has 1024 symbols and is orthogonal relative to the other 1023 codewords in the set).

Figure 1:
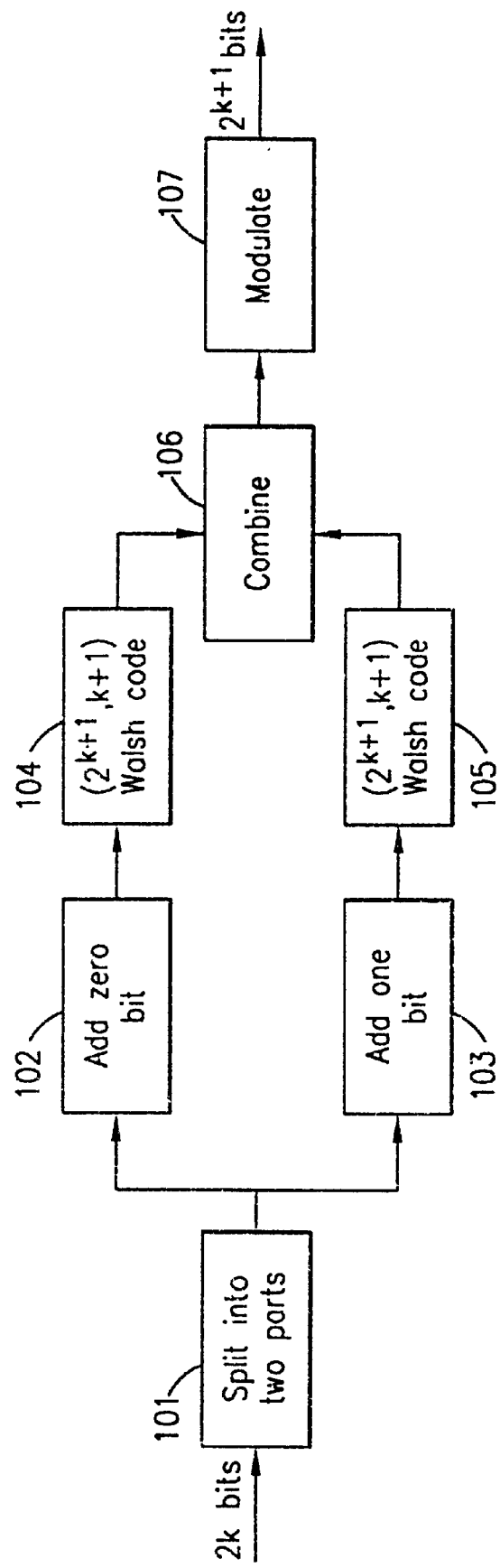
FIG. 1 is a diagrammatic representation of the orthogonal coding scheme of the present invention where different parts of an information word are transmitted in parallel.

Consider first the transmission of two orthogonal codewords in parallel as shown in FIG. 1. Assume that the value of k in the example illustrated in FIG. 1 is 9. In this exemplary first embodiment of the present invention, 18 information bits are split at 101 into two groups of 9 bits each. A different additional bit is then inserted or attached to each information word as shown at 102 & 103. This provides a mechanism for specifying the relative ordering of the two information half-words and helps ensure that the two half-words can be properly re-assembled at the receiver.

In the preferred embodiment of the present invention the additional bit is suffixed as the least significant bit of the extended information half-word. Consequently, the odd-numbered rows of the Hadamard matrix correspond to the information half-words having the suffix "0" while the even-numbered rows of the Hadamard matrix correspond to the information half-words having the suffix "1".

In an alternative embodiment of the present invention, the additional bit is prefixed as the most significant bit of the extended information half-word. This scheme results in the top half of the Hadamard matrix corresponding to the information half-words having the prefix "0" while the bottom half of the Hadamard matrix corresponding to the information half-words having the prefix "1". The examples considered in the rest of this patent application will be based on the suffix technique rather than the prefix technique of attaching index bits. However, it should be emphasized that the two techniques are equally applicable in all variations of the present invention described herein. Furthermore, it should be noted that all index bits need not necessarily be prefixed or suffixed or even be contiguous and may indeed be inserted into preselected positions of the composite word.

The two 10-bit exemplary information half-words are then encoded as shown at 104 & 105 using a $(2^{10},10)$ Walsh code to obtain two 1024-bit codewords. It should be noted that since different bits were attached to each information half-word, the two codewords obtained after encoding with the $(2^{10},10)$ Walsh code are guaranteed to be distinct. These codewords are then summed together at 106, modulated at 107 and sent over the air simultaneously, as shown in FIG. 1. This scheme can be shown to result in an effective coding rate of 18/1024 (i.e., every 18-bit information word can be uniquely mapped to a combination of two 1024-symbol codewords).

Figure 2:
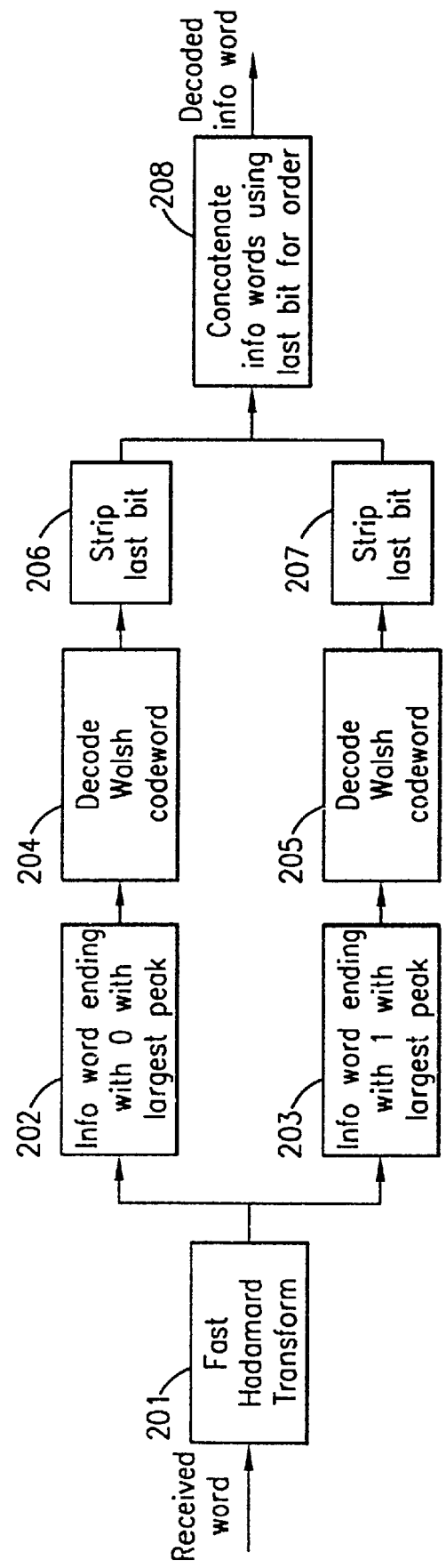
FIG. 2 depicts the decoder for the orthogonal coding scheme with parallel transmission of the various parts of an information word.

The decoder for the coding scheme of FIG. 1 is shown in FIG. 2. Decoding of the information symbols is performed by correlating the received waveform with each of the $2^{K+1}$ possible transmitted codewords using the Fast Hadamard Transform as shown at 201.

The codeword components are split into two parts, the first consisting of codewords corresponding to information half-words ending with a zero ("0") bit and the second corresponding to information half-words ending with the unity ("1") bit. The codeword components that show maximum correlation in each half are chosen at 202 and 203 as the transmitted codewords. These Walsh codewords are first decoded at 204 and 205. Next, the trailing bits of the two decoded half-words are discarded at 206 and 207. The two information half-words are then concatenated at 208 using the trailing bit as the re-ordering index to yield the decoded (original) information word.

In the above scheme, bandwidth utilization was improved by using a code set having 512×512 (i.e., 262,144) codewords as opposed to using an orthogonal code set of $2^{10}$ (i.e., 1024 code words). Thus, the new code set includes all possible combinations of two codewords whose associated information half-words had differing last bits. In another embodiment of the present invention, the bandwidth utilization can be further improved by considering a code set that comprises, in addition to all possible combinations of two codewords also including the 1024 original single codewords. This leads to a code set having a total of $^{1024}C_2+1024$ (i.e., 524,800) codewords.

Since each codeword is mapped to a distinct information word, we now have more codewords for the same number of information words. These 524,800 information words can be represented by $\lfloor \log_2 524,800 \rfloor$ bits (i.e., 19 bits). Thus there exists some mapping from about 19 bits of information words to the 524,800 available codewords that allows a coding rate of 19/1024 which corresponds to a further improvement over the 18/1024 coding rate obtained with the earlier scheme.

Figure 3:
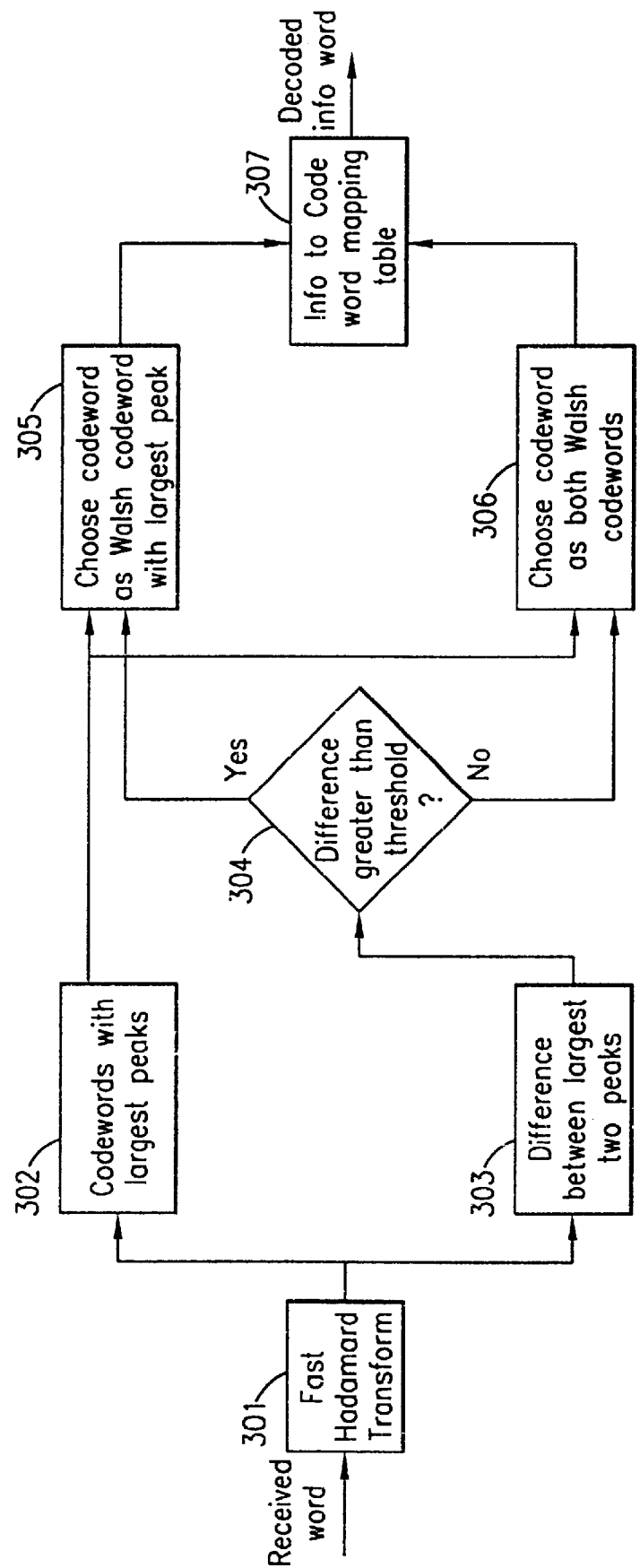
FIG. 3 depicts the decoder for the orthogonal coding scheme where the code set comprises single codewords as well as certain combinations of two codewords.

The decoder associated with this second scheme is shown in FIG. 3. Decoding for this second scheme is as earlier except that when two Walsh codewords with high correlation values are not found at 304, it is now assumed that the transmission was a single Walsh codeword and the Walsh codeword with the highest correlation value is assumed at 305 to be the transmitted codeword. A threshold setting that specifies the maximum difference between the correlation values of the two highest codewords is used at 304 to determine whether one or two Walsh codewords have been transmitted. The selected codewords are decoded at 307 using a look-up table that maps information words to specific codewords or combinations of codewords.

In general, we can extend both of the schemes described above to the case of simultaneous transmission of N Walsh codewords (where $N \geq 2$). In the coding scheme depicted in FIG. 1, the $\lceil \log_2 N \rceil$ bits of each information part-word needs to be reserved for specifying the order of transmission of the codewords. As noted earlier, these ordering bits can be prefixed or suffixed to the information part-words.

In the second coding scheme described above where all combinations of two codewords and all single codewords constitute the code set used to transmit the segmented information word, the decoder of FIG. 3 would have to first determine the total number of Walsh codewords being transmitted and then use a mapping table to determine the exact information word that was transmitted. In comparison with the first coding scheme, the second coding scheme thus has better bandwidth utilization, but at the cost of higher complexity and (possibly) lower error performance.

Figure 4:
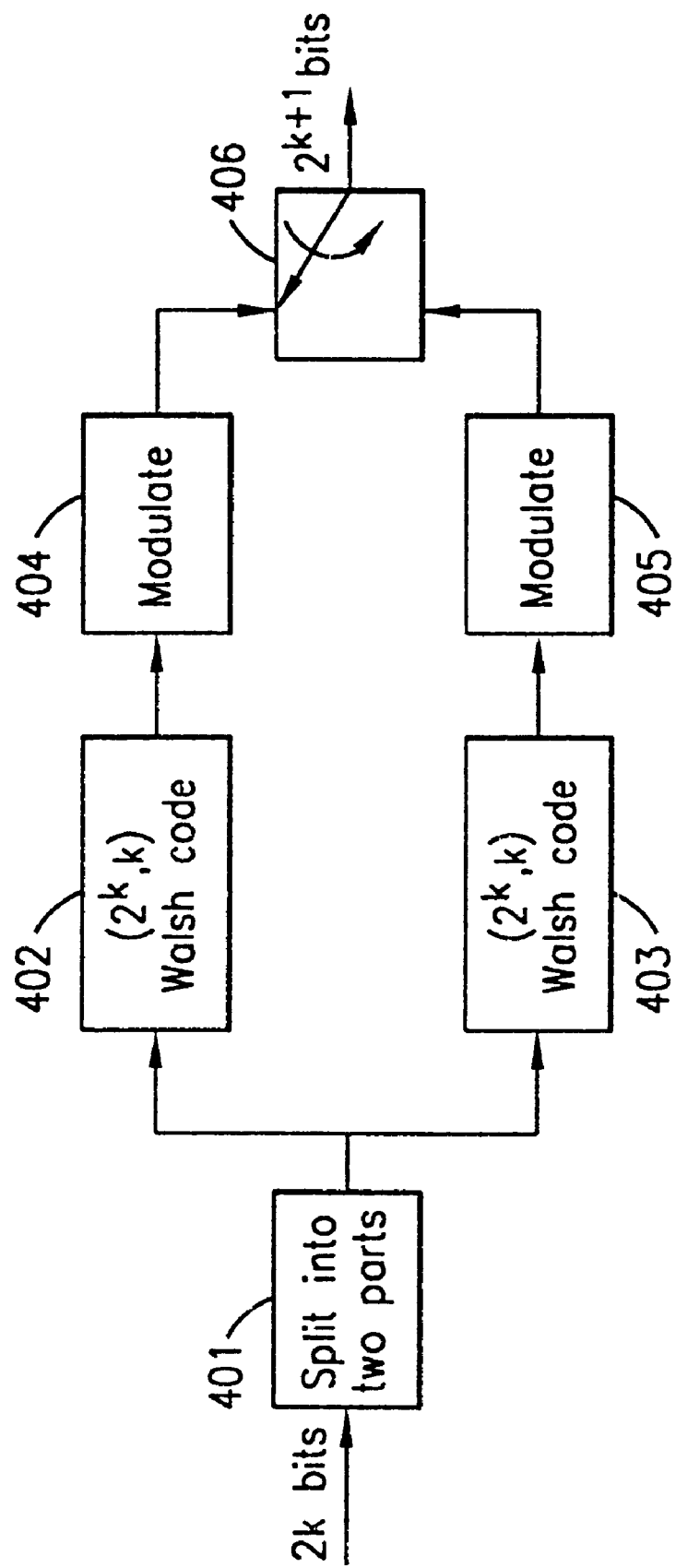
FIG. 4 illustrates an alternative embodiment of the present invention wherein multiple information part-words are serially transmitted over a transmission channel.

FIG. 4 illustrates yet another technique for obtaining the same bandwidth efficiency as with the parallel transmission schemes detailed above. In this embodiment of the present invention, the original information word having 2k bits is split into two parts at 401. The two information part-words are encoded using $(2^k,k)$ Walsh codes as shown at 402 & 403. Each of these two codewords is half the length of the original codeword. The two codewords are modulated at 404 & 405 and transmitted serially as $2^{k+1}$ bits at 406.

As an illustrative example, consider the same $(2^{10},10)$ orthogonal code that was used earlier. As shown below, we can obtain better bandwidth utilization by sequentially transmitting two 512-symbol (i.e., $2^9$ symbol) codewords. The combined length of these sequentially-transmitted pair of codewords is 1024 symbols which is the same length as the original codeword. However, the number of information bits encoded by sequentially transmitting a pair of such codewords is 9+9 bits (i.e., 18 bits). Hence, this technique too has a coding rate of 18/1024 (like the first encoding scheme) rather than the 10/1024 coding rate associated with the $(2^{10},10)$ coding scheme.

Figure 5:
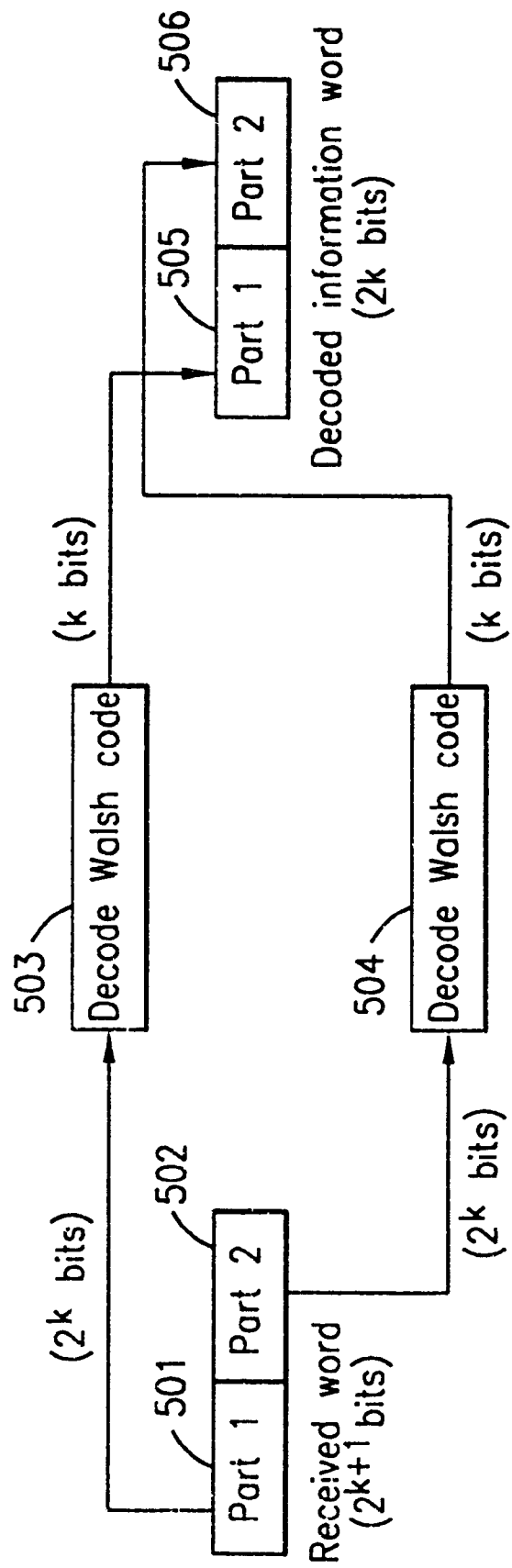
FIG. 5 depicts the decoder associated with the serial transmission embodiment of the present invention.

FIG. 5 shows the decoder associated with the serial transmission scheme. The decoder is straightforward and comprises two decoders 503 & 504 for the shorter (512-symbol) Walsh code embodying a Fast Hadamard Transform as discussed earlier. The two codewords 501 & 502 are independently decoded at 503 & 504 respectively and the decoded information words 505 & 506 are concatenated together in the order received. In general, we can extend this third technique to permit N shorter codewords to be transmitted sequentially, where $N \geq 2$.

In yet another embodiment of the present invention, a new codeword of the same length as the original codeword (i.e., the 1024-symbol codeword in the example discussed above) is transmitted instead of using multiple shorter codewords, but where the new codeword belongs to a code family with a higher coding rate. This embodiment permits more information bits to be encoded than before while using a new codeword of the same length as the original codeword. A Reed-Muller code is an example of such a higher rate code.

Figure 6:
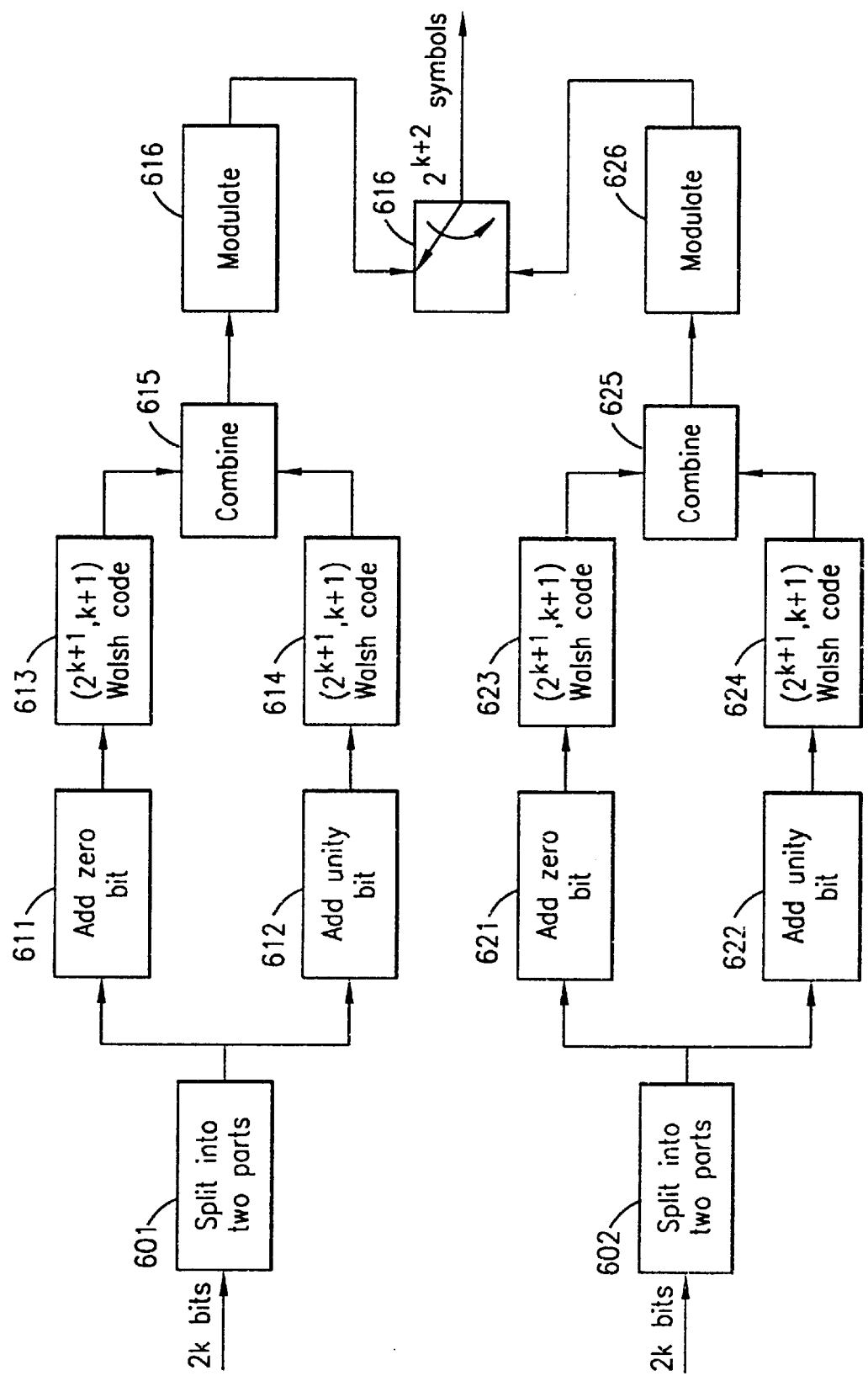
FIG. 6 is a flow chart illustrating another embodiment of the present invention wherein both the serial and parallel transmission techniques are used simultaneously.

FIG. 6 shows how even higher bandwidth efficiencies can be obtained by simultaneously transmitting codewords in both serial and parallel manner. The bandwidth efficiency of this combination scheme is once again computed assuming that the original code was a $(2^{10},10)$ Walsh code. As exemplified in FIG. 6, this embodiment of the present invention involves the sequential transmission of two sets of codewords where each set consists of two Walsh codewords that are transmitted simultaneously.

The example illustrated in FIG. 6 can be understood by assuming that k=8 in the figure. We first append a zero bit to the first block of 8 information bits at 611 and a one bit to the second block of 8 information bits at 612. Both these blocks of 9 bits is then encoded at 613 & 614 using the $(2^9,9)$ Walsh code to form two 512-symbol codewords. These codewords are then added at 615 to form one 512-symbol set as shown at 616. Similarly as shown at 621–626, the third and fourth block of information bits are encoded to form a second 512-symbol set. These two sets of 512 symbols are then transmitted sequentially as shown at 630.

It should be noted that the resulting transmission of 1024 symbols is the same length as the original code word. However, the number of information bits encoded by this latest scheme is 32. Hence, the coding rate of this scheme is 32/1024. The decoding process for this combination scheme proceeds by using the decoder of FIG. 2 on each of the two 512-symbol blocks that are received and then ordering the four decoded information words together to recreate the 32 information bits that were transmitted.

Figure 7:
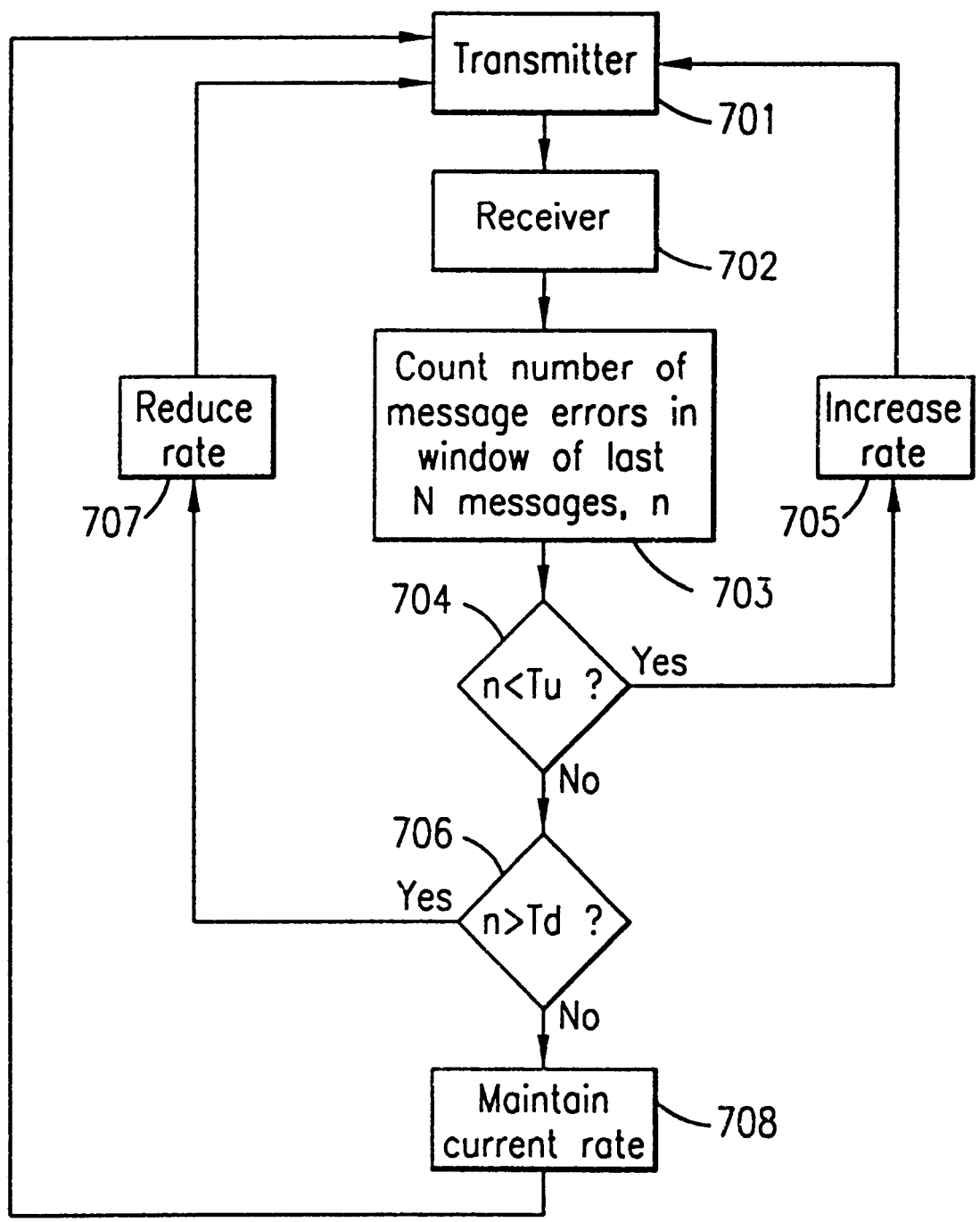
FIG. 7 is a flow chart of the various steps of an exemplary signaling scheme that can be used in a variable transmission rate telecommunications system.

It should also be noted that the different encoding schemes disclosed in this invention can be used to support variable transmission rates between a transmitter and a receiver since each of the schemes detailed above has a different bandwidth utilization and consequently a different information rate. Support of variable transmission rates is possible only when control signaling between the transmitter and the receiver is permissible and feasible. One possible variable transmission rate scheme is shown in FIG. 7. In this scheme, the receiver 702 signals the transmitter 701 to either reduce (at 707) or increase (at 705) its transmission rate depending on the number of frame errors, n, that are detected at the receiver 702 in a fixed time-period Tn. The receiver and transmitter in such a scheme communicate to establish the precise message number for which the rate change is made. The encoding scheme corresponding to various transmission rates are pre-arranged and the transmitter steps up or down among these levels based on the receiver input level. It should be noted that variable rate systems can be implemented in a variety of ways and the above example has been provided only to illustrate the use of the present invention in one such system.

For example, a variable rate system without control signaling can be implemented by using a threshold, as described earlier, to detect whether one or more codewords have been transmitted in parallel. If only one codeword is detected, the receiver assumes a lower rate system (e.g., a (10,1024) system). On the other hand, if two or more codewords are detected, the receiver assumes a higher rate system (such as the (18,1024) system described earlier).

Figure 8:
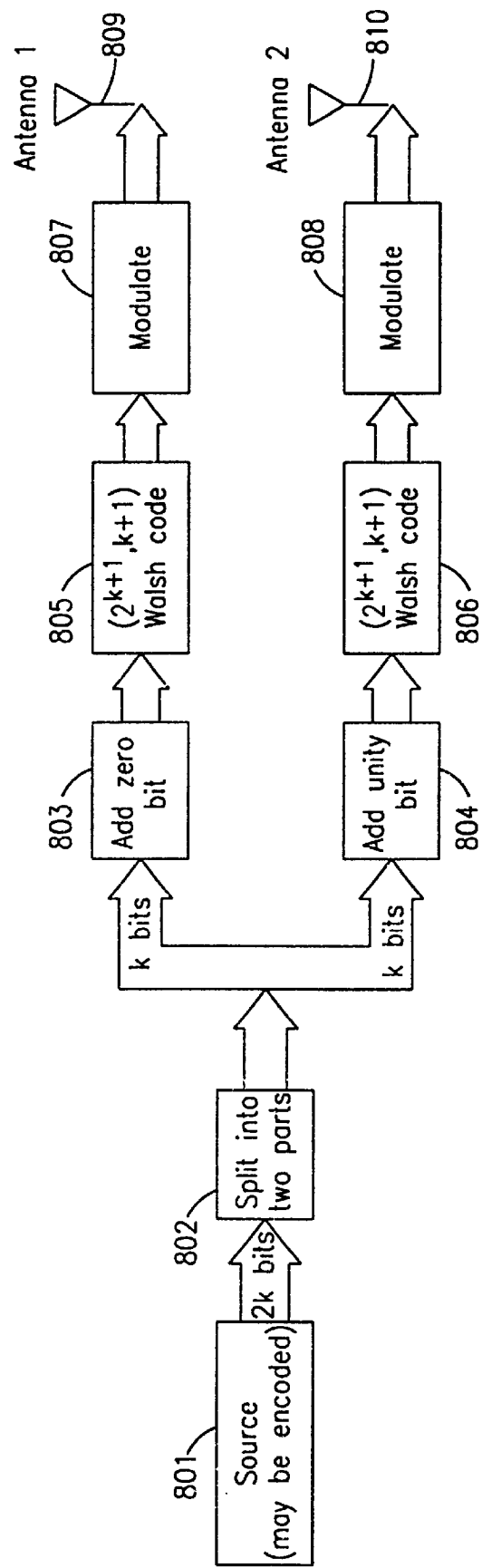
FIG. 8 is a flow chart illustrating the use of the present invention with multiple antennae to provide spatio-temporal diversity.

It should also be noted that other forms of diversity such as multiple antennas can also be used with the coding scheme of the present invention to further improve the bandwidth utilization and performance. For example, multiple sets of codewords could be transmitted from different antennas. FIG. 8 illustrates such a multi-antenna system that is based upon the example of FIG. 1 for the simultaneous transmission of two codewords. Multiple antenna 809 & 810 can be used to provide polarization diversity and/or spatial diversity. Such a multiple antenna system could be part of a simulcast system, as used in cellular systems, land mobile radio systems, paging networks and indoor networks such as Local Area Networks (LANs).

It should be noted that the invention described can be used with any orthogonal or near orthogonal code set and Walsh codes have been used in the above discussions only for ease of description.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. A method of encoding an original information word having K bits that improves the coding efficiency and bandwidth utilization of a telecommunications channel using orthogonal codes, said method comprising the steps of:
    splitting the original information word into M part words, each of said M part words having $K_1, K_2, \ldots K_M$ bits respectively;
    extending each of said M part words of the original information word by integrating each part word with an associated N-bit index word, said associated N-bit index word containing an unique identifier relating it to a specific part word, and the length of the index word being constrained by the relation $N \geq \lceil \log_2 M \rceil$;
    encoding the $K_m+N$ bits of each of said extended part words using a $(2^{K_m+N}, K_m+N)$ Walsh code to obtain an extended Walsh codeword having $2^{K_m+N}$ symbols, where m takes successive integral values between 1 and M inclusive; and
    adding the M extended Walsh codewords to obtain a summed Walsh codeword having $2^{K_{max}+N}$ symbols, where $K_{max}=\max [K_1, K_2, \ldots, K_M]$.

2. The method of claim 1 for improving the coding efficiency and bandwidth utilization of a channel using orthogonal codes, wherein the original part word is split into two part words.

3. The method of claim 2 for improving the coding efficiency and bandwidth utilization of a channel using orthogonal codes, wherein both of said part words are equal in length.

4. The method of claim 1 for improving the coding efficiency and bandwidth utilization of a telecommunications channel using orthogonal codes, additionally comprising the step of:
    modulating and transmitting said summed Walsh codeword having $2^{K_{max}+N}$ symbols over an air interface.

5. The method of claim 4 for improving the coding efficiency and bandwidth utilization of a telecommunications channel using orthogonal codes, as applied to a Code Division Multiple Access (CDMA) telecommunications system, wherein said step of modulating said summed Walsh codeword additionally comprises the step of spreading the signal prior to transmission of the waveform.

6. The method of claim 4 for improving the coding efficiency and bandwidth utilization of a telecommunications channel using orthogonal codes, additionally comprising the step of:
    receiving and demodulating said summed Walsh codeword having $2^{K_{max}+N}$ symbols over an air interface.

7. A method of encoding an original information word having 2K bits that improves the coding efficiency and bandwidth utilization of a telecommunications channel using orthogonal codes, said method comprising the steps of:
    splitting the original information word into a first part and a second part, each of said parts having K bits;
    concatenating said first part of the original information word with a single bit having the value zero;
    concatenating said second part of the original information word with a single bit having the value one; encoding the K+1 bits of said concatenated first part of the original information word using a $(2^{K+1}, K+1)$ Walsh code to obtain a first Walsh codeword having $2^{K+1}$ symbols;
    encoding the K+1 bits of said concatenated second part of the original information word using a $(2^{K+1}, K+1)$ Walsh code to obtain a second Walsh codeword having $2^{K+1}$ symbols; and
    adding said first Walsh codeword and said second Walsh codeword to obtain a summed Walsh codeword with $2^{K+1}$ symbols.

8. The method of claim 7 for improving the coding efficiency and bandwidth utilization of a telecommunications channel using orthogonal codes, wherein said step of concatenating said first part of the original information word with a single bit having the value zero is performed by prefixing said zero bit to said first part of the original information word.

9. The method of claim 7 for improving the coding efficiency and bandwidth utilization of a telecommunications channel using orthogonal codes, wherein said step of concatenating said first part of the original information word with a single bit having the value zero is performed by suffixing said zero bit to said first part of the original information word.

10. The method of claim 7 for improving the coding efficiency and bandwidth utilization of a telecommunications channel using orthogonal codes, wherein said step of concatenating said second part of the original information word with a single bit having the value one is performed by prefixing said one bit to said second part of the original information word.

11. The method of claim 7 for improving the coding efficiency and bandwidth utilization of a telecommunications channel using orthogonal codes, wherein said step of concatenating said second part of the original information word with a single bit having the value one is performed by suffixing said one bit to said second part of the original information word.

12. The method of claim 7 for improving the coding efficiency and bandwidth utilization of a telecommunications channel using orthogonal codes, additionally comprising the step of:
    modulating and transmitting said summed Walsh codeword having $2^{k+1}$ symbols over an air interface.

13. The method of claim 12 for improving the coding efficiency and bandwidth utilization of a telecommunications channel using orthogonal codes, as applied to a Code Division Multiple Access (CDMA) telecommunications system, wherein said step of modulating said summed Walsh codeword additionally comprises the step of spreading the signal prior to modulation of the waveform.

14. The method of claim 12 for improving the coding efficiency and bandwidth utilization of a telecommunications channel using orthogonal codes, additionally comprising the step of:
  receiving and demodulating said summed Walsh codeword having $2^{K+1}$ symbols over an air interface.

15. A method of decoding a demodulated composite Walsh codeword received over a telecommunications channel using orthogonal codes into an original information word, comprising the steps of:
  decomposing the received composite Walsh codeword into component Walsh codewords using the Fast Hadamard Transform;
  decoding each of said possibly transmitted component Walsh codewords to obtain associated possible information partwords;
  separating said decoded possible information partwords into a first list and a second list, said first list comprising decoded information partwords having a unity bit at a specified first position, and said second list comprising decoded information partwords having a zero bit at a specified second position;
  ordering said first list of decoded information partwords by decreasing value of correlation between the component Walsh codeword associated with an information partword in said first list and said received composite Walsh codeword;
  ordering said second list of decoded information partwords by decreasing value of correlation between the component Walsh codeword associated with an information partword in said second list and said received composite Walsh codeword;
  synthesizing a first data partword by selecting the highest ranking information partword from said first list and deleting the unity bit from said specified first position;
  synthesizing a second data partword by selecting the highest ranking information partword from said second list and deleting the zero bit from said specified second position; and
  concatenating said first and second data partwords in a specific order to obtain the original information word.

16. The method of claim 15 for decoding a demodulated composite Walsh codeword received over a telecommunications channel using orthogonal codes into an original information word, wherein said unity bit is suffixed to said data partword.

17. The method of claim 15 for decoding a demodulated composite Walsh codeword received over a telecommunications channel using orthogonal codes into an original information word, wherein said unity bit is prefixed to said data partword.

18. The method of claim 15 for decoding a demodulated composite Walsh codeword received over a telecommunications channel using orthogonal codes into an original information word, wherein said zero bit is suffixed to said data partword.

19. The method of claim 15 for decoding a demodulated composite Walsh codeword received over a telecommunications channel using orthogonal codes into an original information word, wherein said zero bit is prefixed to said data partword.

20. A method of encoding an original information word having M times K bits of binary information that improves the coding efficiency and bandwidth utilization of a telecommunications channel using orthogonal codes, said method comprising the steps of:
  splitting the original information word into M information partwords, each of said M information partwords having K bits;
  concatenating each of said M information partwords with N index bits, where N is not less than $\lceil \log_2 M \rceil$ bits in length, and where the index bits for the $m^{th}$ information partword are the binary representation of m−1;
  encoding the K+N bits of said concatenated information partwords using a $(2^{K+N}, K+N)$ Walsh code to obtain a group of M Walsh codewords, each having $2^{K+N}$ symbols; and
  summing the codewords of said set of M Walsh codewords to obtain a summed Walsh codeword with $2^{K+N}$ symbols.

21. A method of decoding a demodulated composite Walsh codeword that is received over a telecommunications channel using orthogonal codes into an original information word, said composite Walsh codeword being $2^{K+N}$ symbols in length and comprising M orthogonal Walsh codewords, said method comprising the steps of:
  decomposing the received composite Walsh codeword into M lists of component Walsh codewords having $2^{K+N}$ symbols each using the Fast Hadamard Transform, each of said list comprising codewords containing a specified index;
  decoding each of said M lists of component Walsh codewords to obtain at least M information partwords each of which is K+N bits in length;
  sorting each of said decoded information partwords based upon the binary value in N specific index bits of each of the M decoded information partwords;
  ordering each of M lists of decoded information partwords by decreasing value of correlation between the component Walsh codeword associated with the decoded information partword in said list and said received composite Walsh codeword;
  synthesizing M data partwords by selecting the highest ranking decoded information partword from each of said M lists and deleting the N index bits contained in said decoded information partwords; and
  assembling said M data partwords in a specific order to obtain the original information word.

22. A method of encoding an original information word having $\lfloor \log_2(2^{2K-1}+2^{K-1}) \rfloor$ bits of binary information to improve the coding efficiency and bandwidth utilization of a telecommunications channel using orthogonal codes, said method comprising the steps of:
  creating an extended Walsh code set $2^K$ symbols in length comprising all single Walsh codewords having $2^K$ symbols and all combinations of two Walsh codewords having $2^K$ symbols;
  mapping each distinct information word to a simple or composite codeword in said Walsh code set; and
  adding all codewords corresponding to said distinct information word to obtain a summed Walsh codeword $2^K$ symbols in length.

23. A method of decoding a demodulated composite Walsh codeword that is received over a telecommunications channel using orthogonal codes into an original information word, said composite Walsh codeword being $2^K$ symbols in length and comprising two or fewer orthogonal Walsh codewords, said method comprising the steps of:

specifying a threshold value for the maximum acceptable difference in the correlation values of received Walsh codewords;

decomposing the received composite Walsh codeword into one or more component Walsh codewords having $2^K$ symbols each using the Fast Hadamard Transform;

sorting the component Walsh codewords contained in said received composite Walsh codeword based upon the correlation between each component Walsh codeword and said received composite Walsh codeword;

selecting the two highest ranking component Walsh codewords if the difference between their correlation values is less than said specified threshold value and otherwise selecting only the highest ranking component Walsh codewords; and determining the information word associated with said selected Walsh codewords using a mapping table.

24. A method of encoding an information word having 2K bits that improves the coding efficiency and bandwidth utilization of a telecommunications channel using orthogonal codes, said method comprising the steps of:

splitting the information word into a first part having K+M bits and a second part having K−M bits;

encoding the K+M bits of said first part of the information word using a $(2^{K+M},K+M)$ Walsh code to obtain a first Walsh codeword having $2^{K+M}$ symbols;

encoding the K−M bits of said second part of the information word using a $(2^{K-M},K-M)$ Walsh code to obtain a second Walsh codeword having $2^{K-M}$ symbols;

concatenating said first Walsh codeword and said second Walsh codeword to obtain a summed Walsh codeword with $2^{K+M}+2^{K-M}$ symbols; and modulating and transmitting said summed Walsh codeword having $2^{K+M}+2^{K-M}$ symbols over an air interface.

25. A method of decoding a demodulated concatenated Walsh codeword set that is received over a telecommunications channel using orthogonal codes into an original information word, said concatenated Walsh codeword set being $2^{K+M}+2^{K-M}$ symbols in length and comprising two sequentially transmitted Walsh codewords of length $2^{K+M}$ symbols and $2^{K-M}$ symbols, said method comprising the steps of:

decatenating the received Walsh codeword set into a first component Walsh codeword having $2^{K+M}$ symbols and a second component Walsh codeword having $2^{X-M}$ symbols;

translating each of said first component Walsh codewords into an information partword having K+M bits;

translating each of said second component Walsh codewords into an information partword having K−M bits; and concatenating each of said two translated information partwords in the order in which they were received to recover the original information word having 2K bits.

26. A method of decoding a demodulated concatenated Walsh codeword set that is received over a telecommunications channel using orthogonal codes into an original information word, said concatenated Walsh codeword set being M times $2^K$ symbols in length and comprising M sequentially transmitted Walsh codewords each $2^K$ symbols in length, said method comprising the steps of:

decatenating the received Walsh codeword set into M component Walsh codewords each having $2^K$ symbols;

translating each of said M component Walsh codewords into an information partword having K bits; and concatenating each of said M translated information partwords in a prescribed order to recover the original information word having K times M bits.

27. The method of claim 26 for decoding a demodulated concatenated Walsh codeword set received over a telecommunications channel using orthogonal codes into an original information word wherein said M translated information partwords are concatenated in the order in which they were received.

28. A system for encoding an original information word having K bits that improves the coding efficiency and bandwidth utilization of a telecommunications channel using orthogonal codes, said system comprising:

means for splitting the original information word into M part words, each of said M part words having $K_1$, $K_2$, ..., $K_M$ bits respectively;

means for extending each of said M part words of the original information word by integrating each part word with an associated N-bit index word, said associated N-bit index word containing an unique identifier relating it to a specific part word, and the length of the index word being constrained by the relation $N \geq \lceil \log_2 M \rceil$;

means for encoding the $K_m+N$ bits of each of said extended part words using a $(2^{K_m+N},K_m+N)$ Walsh code to obtain an extended Walsh codeword having $2^{K_m+N}$ symbols, where m takes successive integral values between 1 and M inclusive; and means for adding the M extended Walsh codewords to obtain a summed Walsh codeword having $2^{K_{max}+N}$ symbols, where $K_{max}=\max[K_1, K_2, \ldots, K_M]$.

29. The system of claim 28 for improving the coding efficiency and bandwidth utilization of a channel using orthogonal codes, wherein the original part word is split into two part words.

30. The system of claim 29 for improving the coding efficiency and bandwidth utilization of a channel using orthogonal codes, wherein both of said part words are equal in length.

31. The system of claim 28 for improving the coding efficiency and bandwidth utilization of a telecommunications channel using orthogonal codes, additionally comprising:

means for modulating and transmitting said summed Walsh codeword having $2^{K_{max}+N}$ symbols over an air interface.

32. The system of claim 31 for improving the coding efficiency and bandwidth utilization of a telecommunications channel using orthogonal codes, as applied to a Code Division Multiple Access (CDMA) telecommunications system, wherein said means for modulating said summed Walsh codeword additionally comprises means for spreading the signal prior to modulation of the waveform.

33. The system of claim 31 for improving the coding efficiency and bandwidth utilization of a telecommunications channel using orthogonal codes, additionally comprising:

means for receiving and demodulating said summed Walsh codeword having $2^{K_{max}+N}$ symbols over an air interface.

34. A system for encoding an original information word having 2K bits that improves the coding efficiency and bandwidth utilization of a telecommunications channel using orthogonal codes, said system comprising:

means for splitting the original information word into a first part and a second part, each of said parts having k bits;

means for concatenating said first part of the original information word with a single bit having the value zero;

means for concatenating said second part of the original information word with a single bit having the value one;

means for encoding the K+1 bits of said concatenated first part of the original information word using a $(2^{K+1}, K+1)$ Walsh code to obtain a first Walsh codeword having $2^{K+1}$ symbols;

means for encoding the K+1 bits of said concatenated second part of the original information word using a $(2^{K+1}, K+1)$ Walsh code to obtain a second Walsh codeword having $2^{K+1}$ symbols; and means for adding said first Walsh codeword and said second Walsh codeword to obtain a summed Walsh codeword with $2^{K+1}$ symbols.

35. The system of claim 34 for improving the coding efficiency and bandwidth utilization of a telecommunications channel using or orthogonal codes, wherein said means for concatenating said first part of the original information word with a single bit having the value zero comprises means for prefixing said zero bit to said first part of the original information word.

36. The system of claim 34 for improving the coding efficiency and bandwidth utilization of a telecommunications channel using orthogonal codes, wherein said means for concatenating said first part of the original information word with a single bit having the value zero comprises means for suffixing said zero bit to said first part of the original information word.

37. The system of claim 34 for improving the coding efficiency and bandwidth utilization of a telecommunications channel using orthogonal codes, wherein said means for concatenating said second part of the original information word with a single bit having the value one comprises means for prefixing said one bit to said second part of the original information word.

38. The system of claim 34 for improving the coding efficiency and bandwidth utilization of a telecommunications channel using orthogonal codes, wherein said means for concatenating said second part of the original information word with a single bit having the value one comprises means for suffixing said one bit to said second part of the original information word.

39. The system of claim 34 for improving the coding efficiency and bandwidth utilization of a telecommunications channel using orthogonal codes, additionally comprising:

means for modulating and transmitting said summed Walsh codeword having $2^{K+1}$ symbols over an air interface.

40. The system of claim 39 for improving the coding efficiency and bandwidth utilization of a telecommunications channel using orthogonal codes, as applied to a Code Division Multiple Access (CDMA) telecommunications system, wherein said means for modulating said summed Walsh codeword additionally comprises means for spreading the signal prior to modulation of the waveform.

41. The system of claim 39 for improving the coding efficiency and bandwidth utilization of a telecommunications channel using orthogonal codes, additionally comprising:

means for receiving and demodulating said summed Walsh codeword having $2^{K+1}$ symbols over an air interface.

42. The system of claim 34 for improving the coding efficiency and bandwidth utilization of a telecommunications channel using orthogonal codes, additionally comprising multiple antennas for providing spatial diversity.

43. The system of claim 34 for improving the coding efficiency and bandwidth utilization of a telecommunications channel using orthogonal codes, additionally comprising multiple antennas for providing polarization and frequency separation.

44. The system of claim 34 for improving the coding efficiency and bandwidth utilization of a telecommunications channel using orthogonal codes, additionally comprising multiple antennas for use in simulcast transmission.

45. A system of decoding a demodulated composite Walsh codeword received over a telecommunications channel using orthogonal codes into an original information word, comprising:

means for decomposing the received composite Walsh codeword into component Walsh codewords using the Fast Hadamard Transform;

means for decoding each of said component Walsh codewords to obtain associated information partwords;

means for separating said decoded information partwords into a first list and a second list, said first list comprising decoded information partwords having a unity bit at a specified first position, and said second list comprising decoded information partwords having a zero bit at a specified second position;

means for ordering said first list of decoded information partwords by decreasing value of correlation between the component Walsh codeword associated with an information partword in said first list and said received composite Walsh codeword;

means for ordering said second list of decoded information partwords by decreasing value of correlation between the component Walsh codeword associated with an information partword in said second list and said received composite Walsh codeword;

means for synthesizing a first data partword by selecting the highest ranking information partword from said first list and deleting the unity bit from said specified first position;

means for synthesizing a second data partword by selecting the highest ranking information partword from said second list and deleting the zero bit from said specified second position; and means for concatenating said first and second data partwords in a specific order to obtain the original information word.

46. The system of claim 45 for decoding a demodulated composite Walsh codeword received over a telecommunications channel using orthogonal codes into an original information word, wherein said unity bit is suffixed to said data partword.

47. The system of claim 45 for decoding a demodulated composite Walsh codeword received over a telecommunications channel using orthogonal codes into an original information word, wherein said unity bit is prefixed to said data partword.

48. The system of claim 45 for decoding a demodulated composite Walsh codeword received over a telecommunications channel using orthogonal codes into an original information word, wherein said zero bit is suffixed to said data partword.

49. The system of claim 45 for decoding a demodulated composite Walsh codeword received over a telecommunications channel using orthogonal codes into an original information word, wherein said zero bit is prefixed to said data partword.

50. A system for encoding an original information word having M times K bits of binary information that improves the coding efficiency and bandwidth utilization of a telecommunications channel using orthogonal codes, said system comprising:

means for splitting the original information word into M information partwords, each of said M information partwords having K bits;

means for concatenating each of said M information partwords with N index bits, where N is not less than $\lceil \log_2 M \rceil$ bits in length, and where the index bits for the $m^{th}$ information partword are the binary representation of m−1;

means for encoding the K+N bits of said concatenated information partwords using a $(2^{K+N}, K+N)$ Walsh code to obtain a group of M Walsh codewords, each having $2^{K+N}$ symbols; and means for summing the codewords of said set of M Walsh codewords to obtain a summed Walsh codeword with $2^{K+N}$ symbols.

51. A system for decoding a demodulated composite Walsh codeword that is received over a telecommunications channel using orthogonal codes into an original information word, said composite Walsh codeword being $2^{K+N}$ symbols in length and comprising M orthogonal Walsh codewords, said system comprising:

means for decomposing the received composite Walsh codeword into at least M component Walsh codewords having $2^{K+N}$ symbols each using the Fast Hadamard Transform;

means for decoding each of said at least M component Walsh codewords to obtain at least M information partwords each of which is K+N bits in length;

means for sorting said at least M decoded information partwords into M lists based upon the binary value in N specific bits of each of the M decoded information partwords;

means for ordering each of M lists of decoded information partwords by decreasing value of correlation between the component Walsh codeword associated with the decoded information partword in said list and said received composite Walsh codeword;

means for synthesizing M data partwords by selecting the highest ranking decoded information partword from each of said M lists and deleting the N index bits contained in said decoded information partwords; and means for concatenating said M data partwords in a specific order to obtain the original information word.

52. A system for encoding an original information word having 2K+1 bits of binary information to improve the coding efficiency and bandwidth utilization of a telecommunications channel using orthogonal codes, said system comprising:

means for creating a Walsh code set $2^K$ symbols in length comprising all single Walsh codewords having $2^K$ symbols and all combinations of two Walsh codewords having $2^K$ symbols;

means for mapping each distinct information word to a simple or composite codeword in said Walsh code set; and means for adding all codewords corresponding to said distinct information word to obtain a summed Walsh codeword $2^K$ symbols in length.

53. A system for decoding a demodulated composite Walsh codeword that is received over a telecommunications channel using orthogonal codes into an original information word, said composite Walsh codeword being $2^K$ symbols in length and comprising two or fewer orthogonal Walsh codewords, said system comprising:

means for specifying a threshold value for the maximum acceptable difference in the correlation values of received Walsh codewords;

means for decomposing the received composite Walsh codeword into one or more component Walsh codewords having $2^K$ symbols each using the Fast Hadamard Transform;

means for sorting the component Walsh codewords contained in said received composite Walsh codeword based upon the correlation between each component Walsh codeword and said received composite Walsh codeword;

means for selecting the two highest ranking component Walsh codewords if the difference between their correlation values is less than said specified threshold value and otherwise selecting only the highest ranking component Walsh codewords; and means for determining the information word associated with said selected Walsh codewords using a mapping table.

54. A system for encoding an information word having 2K bits that improves the coding efficiency and bandwidth utilization of a telecommunications channel using orthogonal codes, said system comprising:

means for splitting the information word into a first part having K+M bits and a second part having K−M bits;

means for encoding the K+M bits of said first part of the information word using a $(2^{K+M}, K+M)$ Walsh code to obtain a first Walsh codeword having $2^{K+M}$ symbols;

means for encoding the K−M bits of said second part of the information word using a $(2^{K-M}, K-M)$ Walsh code to obtain a second Walsh codeword having $2^{K-M}$ symbols;

means for concatenating said first Walsh codeword and said second Walsh codeword to obtain a summed Walsh codeword with $2^{K+M}+2^{K-M}$ symbols; and means for modulating and transmitting said summed Walsh codeword having $2^{K+M}+2^{K-M}$ symbols over an air interface.

55. A system of decoding a demodulated concatenated Walsh codeword set that is received over a telecommunications channel using orthogonal codes into an original information word, said concatenated Walsh codeword set being $2^{K+M}+2^{K-M}$ symbols in length and comprising two sequentially transmitted Walsh codewords of length $2^{K+M}$ symbols and $2^{K-M}$ symbols, said system comprising:

means for decatenating the received Walsh codeword set into a first component Walsh codeword having $2^{K+M}$ symbols and a second component Walsh codeword having $2^{K-M}$ symbols;

means for translating each of said first component Walsh codewords into an information partword having K+M bits using a mapping table;

means for translating each of said second component Walsh codewords into an information partword having K−M bits using a mapping table; and means for concatenating each of said two translated information partwords in the order in which they were received to recover the original information word having 2K bits.

56. A system for decoding a demodulated concatenated Walsh codeword set that is received over a telecommunications channel using orthogonal codes into an original information word, said concatenated Walsh codeword set being M times $2^K$ symbols in length and comprising M sequentially transmitted Walsh codewords each $2^K$ symbols in length, said system comprising:

means for decatenating the received Walsh codeword set into M component Walsh codewords each having $2^K$ symbols;

means for translating each of said M component Walsh codewords into an information partword having K bits using a mapping table; and means for concatenating each of said M translated information partwords in the order in which they were received to recover the original information word having K times M bits.

57. The system of claim 56 for decoding a demodulated concatenated Walsh codeword set received over a telecommunications channel using orthogonal codes into an original information word wherein said M translated information partwords are concatenated in the order in which they were received.

* * * * *

UNITED STATES PATENT AND TRADEMARK OFFICE
CERTIFICATE OF CORRECTION

PATENT NO.     : 6,483,828 B1
DATED          : November 19, 2002
INVENTOR(S)    : Kumar Balachandran It is certified that error appears in the above-identified patent and that said Letters Patent is hereby corrected as shown below:

<u>Column 15,</u>
Line 48, "$2^{x-m}$" should be -- $2^{k-m}$ --.

Signed and Sealed this

Twenty-fifth Day of March, 2003

JAMES E. ROGAN
*Director of the United States Patent and Trademark Office*